United States Patent
Tamakoshi

(10) Patent No.: US 7,850,227 B2
(45) Date of Patent: Dec. 14, 2010

(54) FRONT STRUCTURE FOR VEHICLE

(75) Inventor: Koji Tamakoshi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 15 days.

(21) Appl. No.: 12/442,624

(22) PCT Filed: Sep. 20, 2007

(86) PCT No.: PCT/JP2007/068905

§ 371 (c)(1),
(2), (4) Date: Mar. 24, 2009

(87) PCT Pub. No.: WO2008/038746

PCT Pub. Date: Apr. 3, 2008

(65) Prior Publication Data

US 2010/0084889 A1    Apr. 8, 2010

(30) Foreign Application Priority Data

Sep. 25, 2006    (JP) ................ P2006-259197

(51) Int. Cl.
*B60J 11/00*    (2006.01)
(52) U.S. Cl. ........................ 296/193.09; 296/203.02
(58) Field of Classification Search ............ 296/193.09, 296/203.02
See application file for complete search history.

(56) References Cited

U.S. PATENT DOCUMENTS

| 5,409,264 | A | 4/1995 | Nakatani |
| 2003/0090099 | A1 | 5/2003 | Miyasaka |

FOREIGN PATENT DOCUMENTS

| EP | 0 941 912 A1 | 9/1999 |
| EP | 1 149 756 A2 | 10/2001 |
| EP | 1 712 451 A2 | 10/2006 |
| JP | 2002-053022 | 2/2002 |
| JP | 2003-127895 A | 5/2003 |
| JP | 2003-127985 A | 5/2003 |
| JP | 2003-182625 A | 7/2003 |
| JP | 2006-231965 A | 9/2006 |
| RU | 2283256 C2 | 9/2006 |

*Primary Examiner*—Lori L Lyjak
(74) *Attorney, Agent, or Firm*—Kenyon & Kenyon LLP

(57) ABSTRACT

The present invention provides a vehicle front structure which can efficiently absorb collision energy regardless of collision modes. In at least one embodiment, a load transmission member arranged on inner side faces of a front corner part of a subframe has a male member attached to a front frame and a female member attached to a side frame. When a local load is fed to the front frame, the male and female members engage with each other, whereby the front frame is restrained from rotating in such a direction as to approach the side frame, while the fed collision load is transmitted to the side frame through the load transmission member. When a collision load is fed onto an axis of the side frame, the male and female members separate from each other to block the load transmission through the load transmission member.

13 Claims, 13 Drawing Sheets

(a)

(b)

(a)

(b)

(a)

(b)

FRONT STRUCTURE FOR VEHICLE

This is a 371 national phase application of PCT/JP2007/068905 filed 20 Sep. 2007, claiming priority to Japanese Patent Application No, JP 2006-259197 filed 25 Sep. 2006, the contents of which are incorporated herein by reference.

TECHNICAL FIELD

The present invention relates to a vehicle front structure.

BACKGROUND ART

Japanese Patent Application Laid-Open No. 2003-182625 discloses a vehicle front structure including a subframe constituted by a pair of left and right side frames extending in the front-to-rear direction of the vehicle, a front frame connecting the respective front end parts of the pair of left and right side frames, respective bifurcated parts formed at the rear side parts of the side frames so as to be curved inward in the vehicle width direction, and a rear frame transversely bridged between the left and right bifurcated parts.

This vehicle front structure forms not only a path by which an offset collision load fed to one side frame is transmitted from the bifurcated part to a floor skeleton member through a rear mount part, but also a path by which the offset collision load is transmitted to the other side frame through the rear frame, thereby efficiently transmitting and dispersing the collision load from the rear end side of the subframe to the floor skeleton member.

SUMMARY OF INVENTION

In a collision mode where a local load is directly fed to a part of the front frame in the above-mentioned structure, however, the front frame may bend, thus failing to efficiently transmit and disperse the collision load to the side frames. For efficiently absorbing collision energy in such a collision mode, it is necessary to receive the collision load at the front frame and disperse thus received collision load efficiently to the side frames. Though the bonding strength between the front frame and side frames may be enhanced for this purpose, simply increasing the strength of the joint part may reduce a crash stroke and generate a high collision G in the cabin in a collision mode where the collision load is fed to only one side frame, for example, whereby the deformation mode and energy absorption efficiency are expected to deteriorate to the contrary.

Therefore, for overcoming the problem mentioned above, it is an object of the present invention to provide a vehicle front structure which can efficiently absorb the collision energy regardless of collision modes.

Hence, the vehicle front structure in accordance with the present invention comprises a pair of left and right longitudinal members provided in a front part of a vehicle so as to extend in a front-to-rear direction of the vehicle, a transverse member transversely bridged in a vehicle width direction between respective front end parts of the pair of longitudinal members, and a rotation restricting member for restraining the transverse and longitudinal members from rotating in such a direction as to relatively approach each other but permitting the transverse and longitudinal members to rotate in such a direction as to relatively separate from each other when a collision load is applied from a front of the vehicle.

When a collision load is applied from the front of the vehicle, the transverse and longitudinal members are restrained from rotating in such a direction as to relatively approach each other in the vehicle front structure in accordance with the present invention. Therefore, in a collision mode where a local load is directly fed to a part of the transverse member, for example, the transverse member is restrained from deforming by bending and thus can receive the collision load while being able to disperse the received load to the longitudinal members. On the other hand, the transverse and longitudinal members are permitted to rotate in such a direction as to relatively separate from each other, whereby the energy absorption efficiency of the longitudinal members will not deteriorate in a collision mode where a collision load is fed to only one of the longitudinal members, for example. As a result, the collision energy can be absorbed efficiently regardless of collision modes.

Preferably, in the vehicle front structure in accordance with the present invention, the collision load applied from the front of the vehicle causes the longitudinal member to rotate in such a direction as to separate from the transverse member.

As mentioned above, the transverse and longitudinal members are permitted to rotate in such a direction as to relatively separate from each other. In this case, the longitudinal members can be deformed by rotating in such a direction as to separate from the transverse member while keeping the transverse member from being affected, whereby the energy absorption efficiency of the longitudinal members can reliably be restrained from deteriorating.

Preferably, in the vehicle front structure in accordance with the present invention, when at least one of the longitudinal and transverse members is deformed by the collision load applied from the front of the vehicle, the rotation restricting member transmits the collision load applied to the transverse member to the longitudinal member and blocks the collision load applied to the longitudinal member from being transmitted to the transverse member.

In the collision mode where a local load is directly fed to a part of the transverse member, for example, in this case, the collision load received by the transverse member is efficiently dispersed to the longitudinal members. In the collision mode where a collision load is fed to only one of the longitudinal members, for example, the load is blocked from being transmitted from the longitudinal member to the transverse member, whereby the collision energy can be absorbed by the longitudinal member while keeping the transverse member from being affected. As a result, the collision energy can be absorbed efficiently regardless of collision modes.

Preferably, in the vehicle front structure in accordance with the present invention, the rotation restricting member is arranged such as to engage the longitudinal and transverse members within an area defined by the longitudinal and transverse members, keeps the engagement with the longitudinal and transverse members when the collision load is applied to the transverse member, and is separated from the longitudinal or transverse member when the collision load is applied to the longitudinal member.

In the collision mode where a local load is directly fed to a part of the transverse member, for example, in this case, the engagement of the rotation restricting member with the longitudinal and transverse members is held, so that the transverse member is restrained from deforming by bending and thus can receive the collision load while being able to disperse the received load efficiently to the longitudinal members. In the collision mode where a collision load is fed to only one of the longitudinal members, for example, the rotation restricting member is separated from the longitudinal or transverse member, whereby the collision energy can be absorbed by the longitudinal member while keeping the transverse member from being affected. As a result, the collision energy can be absorbed efficiently regardless of collision modes.

Preferably, the longitudinal and transverse members are side and front frames constituting a subframe, respectively.

The present invention is constructed such as to include a rotation restricting member which restrains the transverse and longitudinal members from rotating in such a direction as to relatively approach each other but permits the transverse and longitudinal members to rotate in such a direction as to relatively separate from each other when a collision load is applied from the front of the vehicle, and thus can control the load transmission according to collision modes, thereby making it possible to absorb the collision energy efficiently regardless of the collision modes.

DESCRIPTION OF EMBODIMENTS

Figure 1:
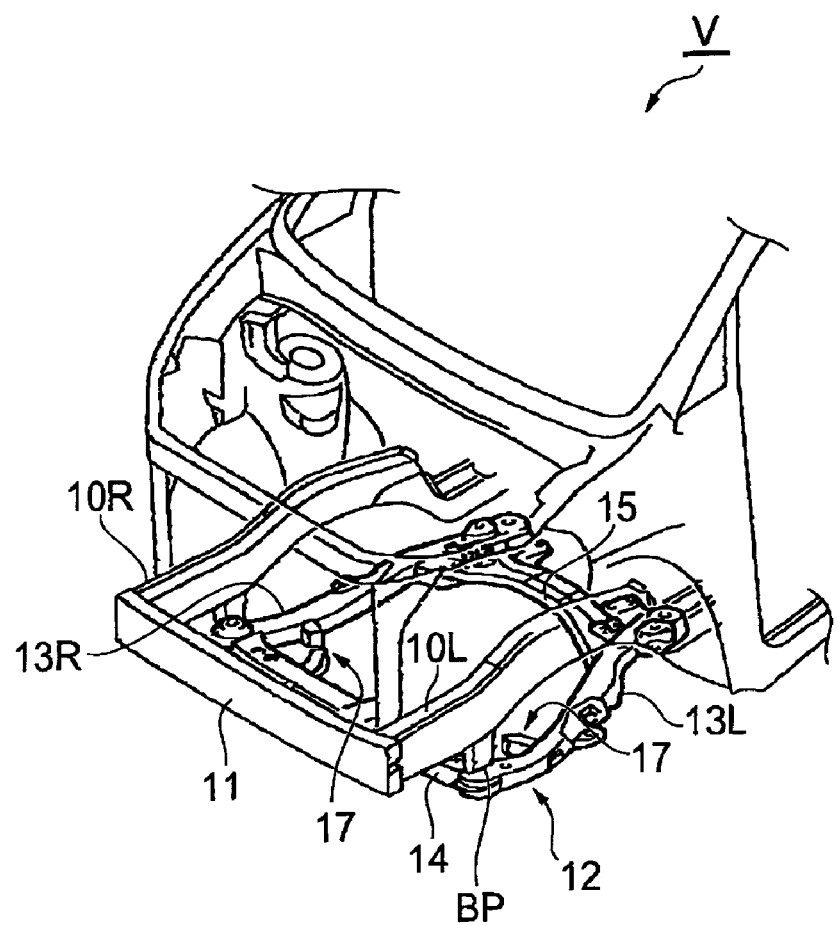
[FIG. 1] is a perspective view showing a skeleton structure of a vehicle employing the vehicle front structure in accordance with a first embodiment.

In the following, preferred embodiments of the present invention will be explained in detail with reference to the drawings. In the drawings, the same or equivalent parts will be referred to with the same signs.

Figure 2:
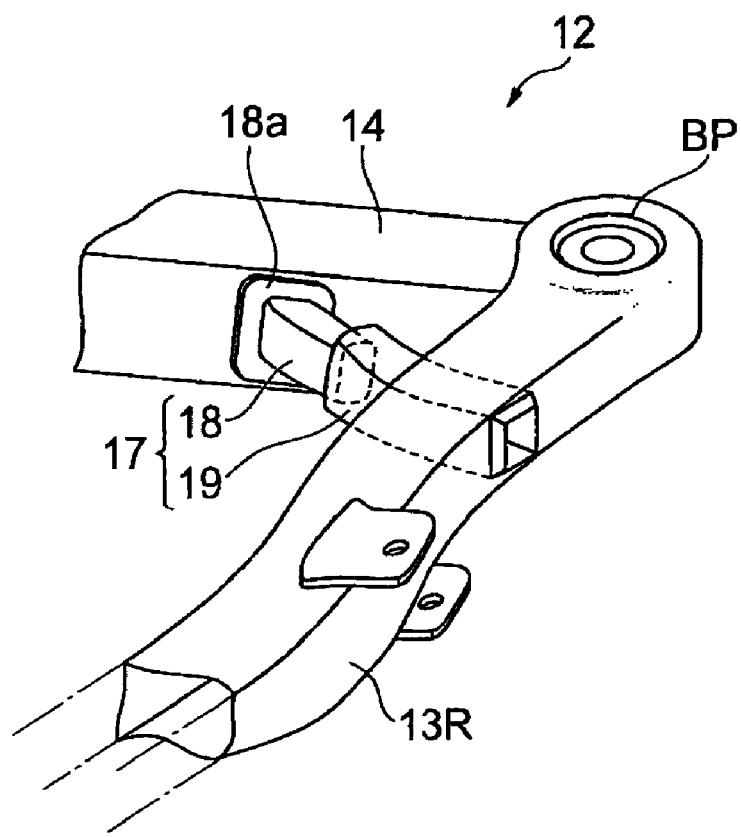
[FIG. 2] is a view showing a load transmission member constituting the vehicle front structure in accordance with the first embodiment.
Figure 3:
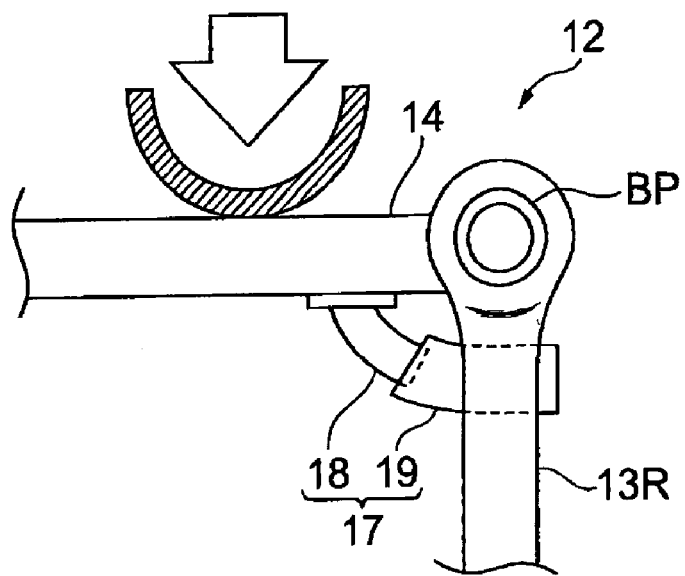
[FIGS. 3](a) and (b) are views for explaining an action in a case where a local load is fed to a front frame constituting the vehicle front structure in accordance with the first embodiment.
Figure 3:
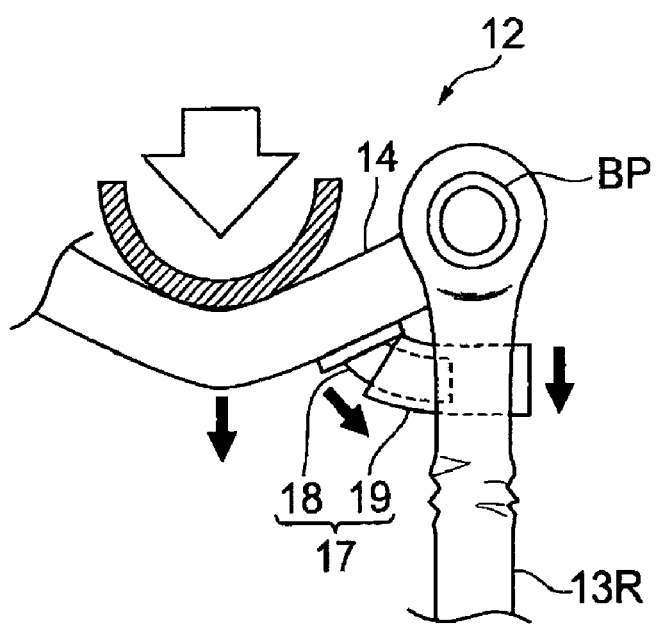
Figure 4:
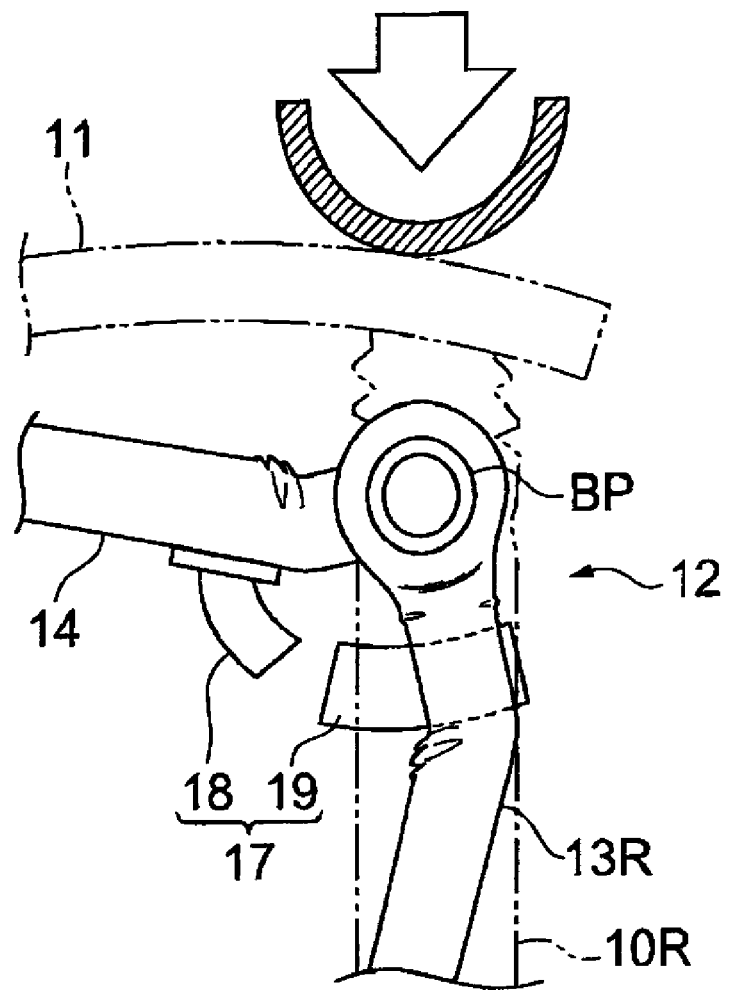
[FIG. 4] is a view for explaining an action in a case where a collision load is fed to a side frame constituting the vehicle front structure in accordance with the first embodiment.

To begin with, the vehicle front structure in accordance with the first embodiment will be explained with reference to FIGS. 1 to 4. A case where the present invention is employed in a subframe of a vehicle will be explained here by way of example. FIG. 1 is a perspective view showing a skeleton structure of the vehicle including the subframe. FIG. 2 is a view showing a load transmission member constituting the subframe. FIGS. 3(a) and (b) are views for explaining an action in a case where a local load is fed to a front frame, whereas FIG. 4 is a view for explaining an action in a case where a collision load is fed to a side frame. By defining the forward direction of a vehicle advancing straightforward as "front", the present specification uses terms representing directions such as front/rear, left/right, and upper/lower.

As shown in FIG. 1, left and right side parts of a front compartment of a vehicle V is provided with a pair of front side members 10L, 10R extending in the front-to-rear direction of the vehicle. Each of the front side members 10L, 10R is a hollow skeleton member having a rectangular cross section. The front side members 10L, 10R are constructed such that their front end parts have a straight form which is easy to collapse, while their rear parts effectively transmit/disperse the energy from the front parts to a front floor under reinforcement, a front pillar, and a rocker, thereby alleviating shocks fed to a cabin.

Between the front end parts of the pair of front side members 10L, 10R, a bumper reinforcement 11 is transversely bridged in the vehicle width direction. The bumper reinforcement 11, which is a hollow skeleton member having a cross section partitioned into three rectangular cells in parallel, is constructed such as to efficiently disperse the energy at the time of collision to the left and right front side members 10L, 10R. The front side members 10L, 10R are bonded to the bumper reinforcement 11 by welding, bolting, or the like.

Arranged below the front side members 10L, 10R is a subframe 12 which supports units such as engine and transmission in a vibration-proof fashion. The subframe 12 comprises a pair of left and right side frames (longitudinal members) 13L, 13R extending in the front-to-rear direction of the vehicle, a front frame (transverse member) 14 connecting the front end parts of the left and right side frames 13L, 13R to each other, and a rear frame 15 connecting the rear end parts of the left and right side frames 13L, 13R to each other. The subframe 12 is fastened to the front side member 10 with bolts at bonding parts BP between the side frames 13L, 13R and the front frame 14. The side frames 13L, 13R are arranged such that their axes substantially align with those of the front side members 10L, 10R when seen in the vehicle height direction.

Inner side faces of each front corner part of the subframe 12 defined by the pair of side frames 13L, 13R, front frame 14, and rear frame 15 are provided with a load transmission member 17. FIG. 2 shows the load transmission member 17 under magnification. FIG. 2 illustrates only the right front corner part of the subframe 12. The subframe 12 is substantially bilaterally symmetric, so that the left front corner part is identical or similar to the right front corner part. Hence, the structure of the right front corner part will be explained alone here without explaining the left front corner part.

As shown in FIG. 2, the load transmission member 17 has a load transmission member male 18 attached to the inner side face of the front frame 14 and a load transmission member female 19, attached to the inner side face of the side frame 13R, having a leading end part of the load transmission member male 18 inserted therein.

The load transmission member male 18 is a hollow member formed like an arc about the vicinity of the bonding part BP while having a rectangular cross section; a flange part 18a formed at the rear end is bonded to the inner side face of the front frame 14 by welding or the like. The leading end part of the load transmission member male 18 is inserted into a leading opening part of the load transmission member female

19. As with the load transmission member male 18, the load transmission member female 19 is a hollow member formed like an arc about the vicinity of the bonding part BP while having a rectangular cross section. The load transmission member female 19 penetrates through the side frame 13R from the inner side face to the outer side face and is bonded to the inner and outer side faces of the side frame 13R by welding.

The opening cross-sectional area of the load transmission member female 19 is made slightly greater than that of the load transmission member male 18. That is, the opening cross-sectional area of the load transmission member female 19 is set to such an extent that, when the leading end part of the load transmission member male 18 is inserted, the outer wall face of the load transmission member male 18 comes into contact with the inner wall face of the load transmission member female 19.

When the vehicle V collides with an obstacle such as a pole, for example, so that a collision load is locally fed to substantially the center part of the front frame 14 from the front of the vehicle as indicated by a whitened arrow in FIG. 3(*a*), the front frame 14 is about to deform by bending into a V shape (i.e., the front frame 14 and side frame 13R are about to rotate in such a direction as to relatively approach each other). Here, the load transmission member male 18 slides along the inner wall face of the load transmission member female 19 until the front frame 14 abuts against the leading end part of the load transmission member female 19.

After the front frame 14 abuts against the leading end part of the load transmission member female 19, the load transmission member female 19 restrains the front frame 14 from rotating in such a direction as to approach the side frame 13R as shown in FIG. 3(*b*). Here, since the engagement between the load transmission member male 18 and load transmission member female 19 is held, the collision load fed to the front frame 14 is transmitted and dispersed to the side frame 13R through the load transmission member 17, so that the side frame 13R deforms by buckling, whereby the collision energy is absorbed.

When the vehicle V collides with an obstacle, so that a collision load is fed onto the axis of the front side member 10R from the front of the vehicle as indicated by a whitened arrow in FIG. 4, on the other hand, the fed collision load is transmitted to the side frame 13R through the bonding part BP. Therefore, the collision load is also fed onto the side frame 13R from the front of the vehicle. Then, by deforming by buckling, both of the front side member 10R and side frame 13R gradually absorb the collision energy. At that time, the side frame 13R is displaced outward of the vehicle while deforming by buckling (i.e., the front frame 14 and side frame 13R rotate in such a direction as to relatively separate from each other).

Here, since the displacement of the side frame 13R away from the front frame 14 is not restricted by the load transmission member 17, the load transmission member male 18 and load transmission member female 19 are separated from each other as the side frame 13R is displaced outward of the vehicle, whereby the load is blocked from being transmitted from the side frame 13R to the front frame 14 through the load transmission member 17. As a result, the front frame 14 is restrained from being affected, whereby the collision energy is appropriately absorbed by the side frame 13R (and front side member 10R).

As mentioned above, when the collision load is applied from the front of the vehicle, the load transmission member 17 restrains the front frame 14 and side frame 13R from rotating in such a direction as to relatively approach each other but permits the front frame 14 and side frame 13R to rotate in such a direction as to relatively separate from each other. Hence, the load transmission member 17 functions as the rotation restricting member recited in the claims.

In a collision mode where a local load is fed to the front frame 14 in this embodiment, the load transmission member 17 restrains the front frame 14 from rotating in such a direction as to approach the side frame 13R. Here, the load transmission member male 18 and load transmission member female 19 engage with each other, whereby the collision load fed to the front frame 14 is transmitted and dispersed to the side frame 13R through the load transmission member 17, so that the side frame 13R deforms by buckling, whereby the collision energy is absorbed.

In a collision mode where a collision load is fed onto the axis of the side frame 13R, on the other hand, the side frame 13R is displaced outward of the vehicle, so that the load transmission member male 18 and load transmission member female 19 are separated from each other, whereby the load transmission through the load transmission member 17 is blocked. As a result, the front frame 14 is restrained from being affected, whereby the collision energy is appropriately absorbed by the side frame 13R.

Thus, this embodiment can control the load transmission according to collision modes, whereby the collision energy can efficiently be absorbed regardless of the collision modes. Though FIG. 4 illustrates an example in which the collision load is fed to the front side member 10R, the same holds for a case where the collision load is directly fed to the side frame 13R.

In this embodiment, the load transmission member male 18 fits into the load transmission member female 19 when the front frame 14 is about to deform so as to bend into a V shape, whereby the collision load can reliably be transmitted.

Figure 5:
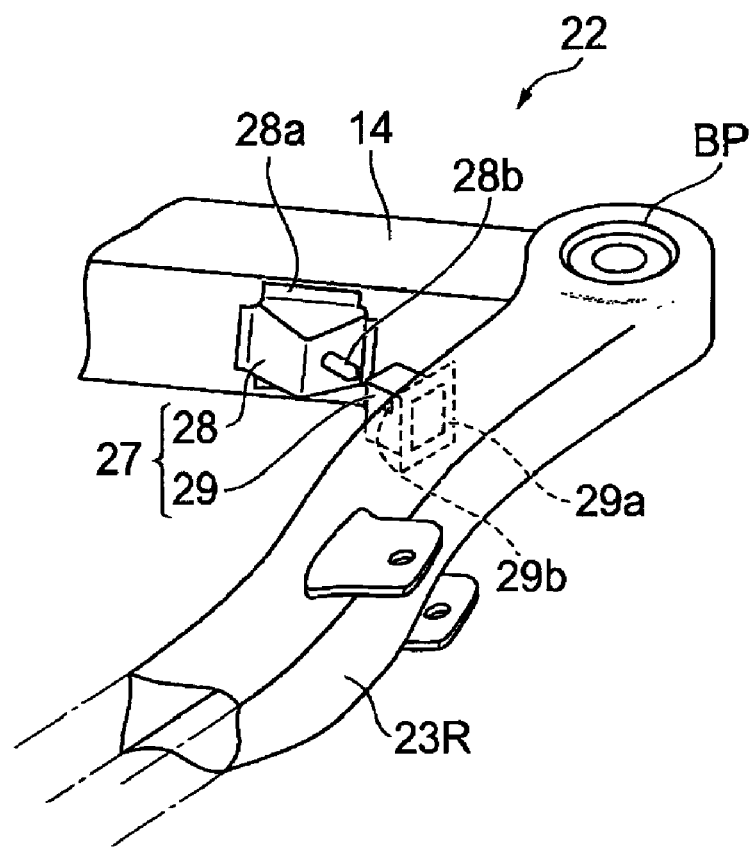
[FIG. 5] is a view showing a load transmission member constituting the vehicle front structure in accordance with a second embodiment.
Figure 6:
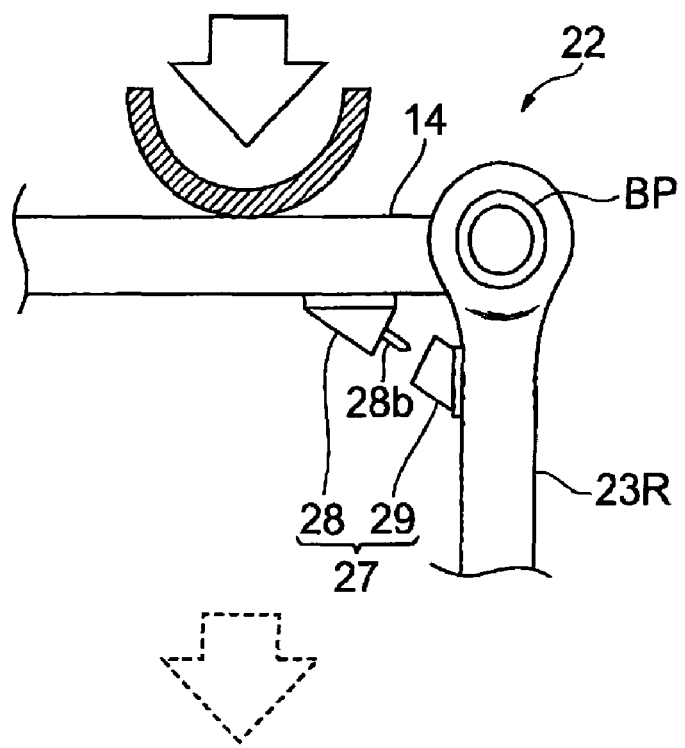
[FIGS. 6](a) and (b) are views for explaining an action in a case where a local load is fed to a front frame constituting the vehicle front structure in accordance with the second embodiment.
Figure 6:
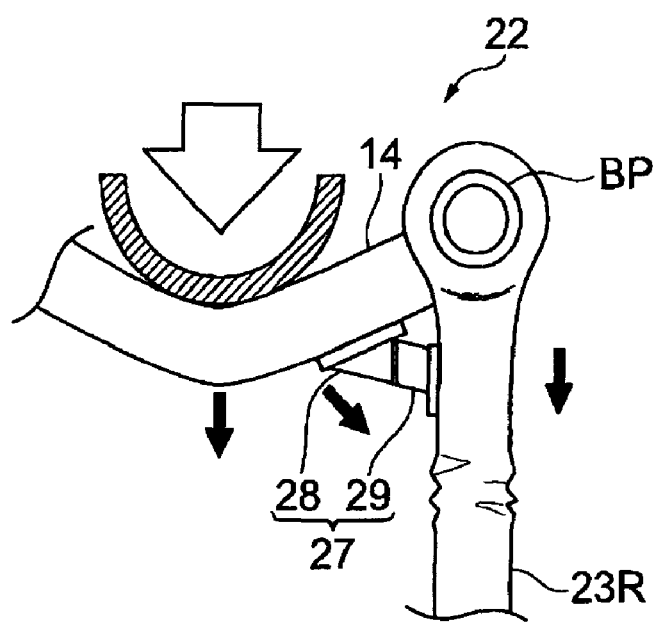
Figure 7:
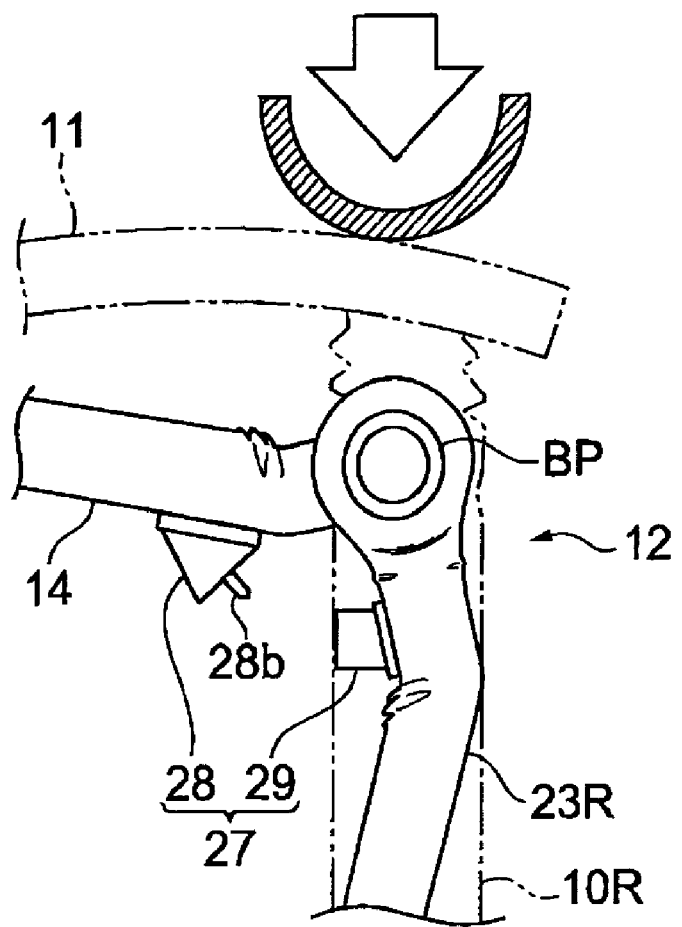
[FIG. 7] is a view for explaining an action in a case where a collision load is fed to a side frame constituting the vehicle front structure in accordance with the second embodiment.

The vehicle front structure in accordance with the second embodiment will now be explained with reference to FIGS. 5 to 7. FIG. 5 is a view showing a load transmission member constituting a subframe in accordance with the second embodiment. FIGS. 6(*a*) and (*b*) are views for explaining an action in a case where a local load is fed to a front frame, whereas FIG. 7 is a view for explaining an action in a case where a collision load is fed to a side frame.

The vehicle front structure in accordance with the second embodiment differs from the above-mentioned first embodiment in that it uses a subframe 22 having a load transmission member 27 attached thereto in place of the subframe 12 having the load transmission member 17 attached thereto. The other structures are identical or similar to the first embodiment and thus will not be explained here.

Inner side faces of each front corner part of the subframe 22 defined by a pair of side frames 23L, 23R (longitudinal members), a front frame 14 (transverse member), and a rear frame 15 are provided with a load transmission member 27. FIG. 5 shows the load transmission member 27 under magnification. FIG. 5 illustrates only the right front corner part of the subframe 22. The subframe 22 is substantially bilaterally symmetric, so that the left front corner part is identical or similar to the right front corner part. Hence, the structure of the right front corner part will be explained alone here without explaining the left front corner part.

As shown in FIG. 5, the load transmission member 27 has a load transmission member male 28 attached to the inner side face of the front frame 14 and a load transmission member female 29 attached to the inner side face of the side frame 23R.

The load transmission member male 28 is a hollow member having a rectangular cross section; a flange part 28*a* formed at the rear end is bonded to the inner side face of the front frame 14 by welding or the like. Here, the load transmission member male 28 is arranged such that its axis is substantially orthogonal to the bisector of the internal angle formed by the side frame 23R and front frame 14 on the same plane. The leading end face of the load transmission member male 28 is placed so as to be substantially parallel to a plane orthogonal to the axis. A pin member 28b is attached to the leading end face of the load transmission member male 28 so as to project toward the load transmission member female 29.

The load transmission member female 29 is also a hollow member having a rectangular cross section; a flange part 29a formed at the rear end is bonded to the inner side face of the side frame 23R by welding or the like. Here, the load transmission member female 29 is arranged such that its axis coincides with the axis of the load transmission member male 28. The leading end face of the load transmission member female 29 is placed so as to be substantially parallel to the leading end face of the load transmission member male 28. A hole 29b is formed in the leading end face of the load transmission member female 29 at a position opposing the above-mentioned pin member 28b. The diameter of the hole 29b is set slightly greater than that of the pin member 28b.

When the vehicle V collides with an obstacle such as a pole, for example, so that a collision load is locally fed to substantially the center part of the front frame 14 from the front of the vehicle as indicated by a whitened arrow in FIG. 6(*a*) in the foregoing structure, the front frame 14 is about to deform by bending into a V shape (i.e., the front frame 14 and side frame 23R are about to rotate in such a direction as to relatively approach each other). Here, after the pin member 28b attached to the leading end face of the load transmission member male 28 is inserted into the hole 29b formed in the leading end face of the load transmission member female 29, the front frame 14 is displaced until the leading end face of the load transmission member male 28 abuts against the leading end face of the load transmission member female 29.

After the leading end face of the load transmission member male 28 abuts against the leading end face of the load transmission member female 29, the load transmission member 27 restrains the front frame 14 from rotating in such a direction as to approach the side frame 23R as shown in FIG. 6(*b*). Here, since the engagement between the load transmission member male 28 and load transmission member female 29 is held by inserting the pin member 28b into the hole 29b, the collision load fed to the front frame 14 is transmitted and dispersed to the side frame 23R through the load transmission member 27, so that the side frame 23R deforms by buckling, whereby the collision energy is absorbed.

When the vehicle V collides with an obstacle, so that a collision load is fed onto the axis of the front side member 10R from the front of the vehicle as indicated by a whitened arrow in FIG. 7, on the other hand, the fed collision load is transmitted to the side frame 23R through the bonding part BP. Therefore, the collision load is also fed onto the side frame 23R from the front of the vehicle. Then, by deforming by buckling, both of the front side member 10R and side frame 23R gradually absorb the collision energy. At that time, the side frame 23R is displaced outward of the vehicle while deforming by buckling (i.e., the front frame 14 and side frame 23R rotate in such a direction as to relatively separate from each other).

Here, since the displacement of the side frame 23R away from the front frame 14 is not restricted by the load transmission member 27, the load transmission member male 28 and load transmission member female 29 are separated from each other as the side frame 23R is displaced outward of the vehicle, whereby the load is blocked from being transmitted from the side frame 23R to the front frame 14 through the load transmission member 27. As a result, the front frame 14 is restrained from being affected, whereby the collision energy is appropriately absorbed by the side frame 23R (and front side member 10R).

As mentioned above, when the collision load is applied from the front of the vehicle, the load transmission member 27 restrains the front frame 14 and side frame 23R from rotating in such a direction as to relatively approach each other but permits the front frame 14 and side frame 23R to rotate in such a direction as to relatively separate from each other. Hence, the load transmission member 27 also functions as the rotation restricting member recited in the claims.

In the collision mode where a local load is fed to the front frame 14 in this embodiment, the load transmission member 27 restrains the front frame 14 from rotating in such a direction as to approach the side frame 23R. Here, the load transmission member male 28 and load transmission member female 29 engage with each other, whereby the collision load fed to the front frame 14 is transmitted and dispersed to the side frame 23R through the load transmission member 27, so that the side frame 23R deforms by buckling, whereby the collision energy is absorbed.

In the collision mode where a collision load is fed onto the axis of the side frame 23R, on the other hand, the side frame 23R is displaced outward of the vehicle, so that the load transmission member male 28 and load transmission member female 29 are separated from each other, whereby the load transmission through the load transmission member 27 is blocked. As a result, the front frame 14 is restrained from being affected, whereby the collision energy is appropriately absorbed by the side frame 23R.

Thus, this embodiment can control the load transmission according to collision modes, whereby the collision energy can efficiently be absorbed regardless of the collision modes. Though FIG. 7 illustrates an example in which the collision load is fed to the front side member 10R, the same holds for a case where the collision load is directly fed to the side frame 23R.

In this embodiment, since the pin member 28b fits into the hole 29b when the front frame 14 is about to deform so as to bend into a V shape, the load transmission member male 28 and load transmission member female 29 can be prevented from misaligning when engaging with each other, whereby the collision load can reliably be transmitted.

Figure 8:
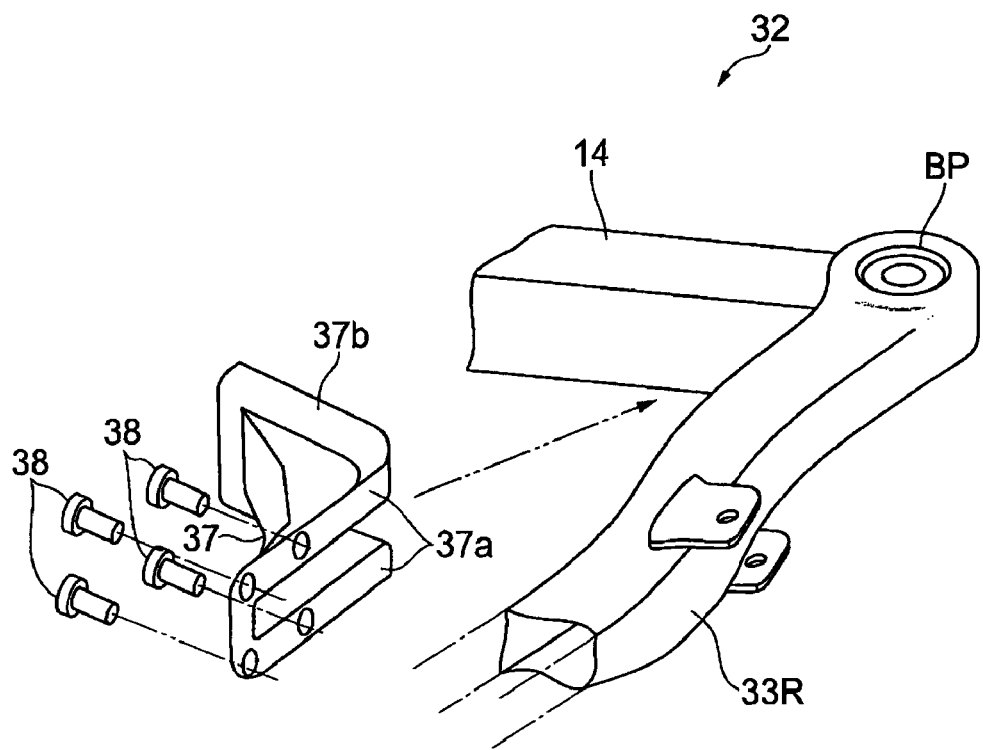
[FIG. 8] is a view showing a load transmission member constituting the vehicle front structure in accordance with a third embodiment.
Figure 9:
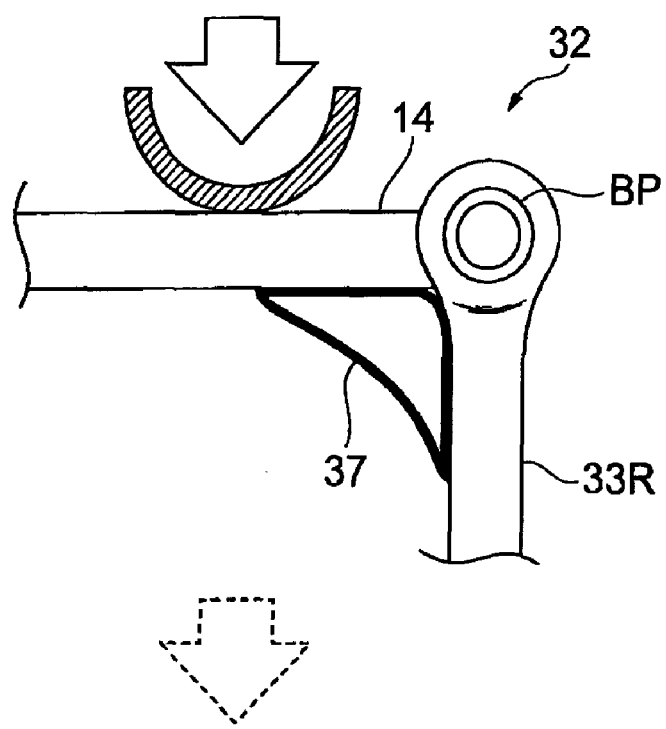
[FIGS. 9](a) and (b) are views for explaining an action in a case where a local load is fed to a front frame constituting the vehicle front structure in accordance with the third embodiment.
Figure 9:
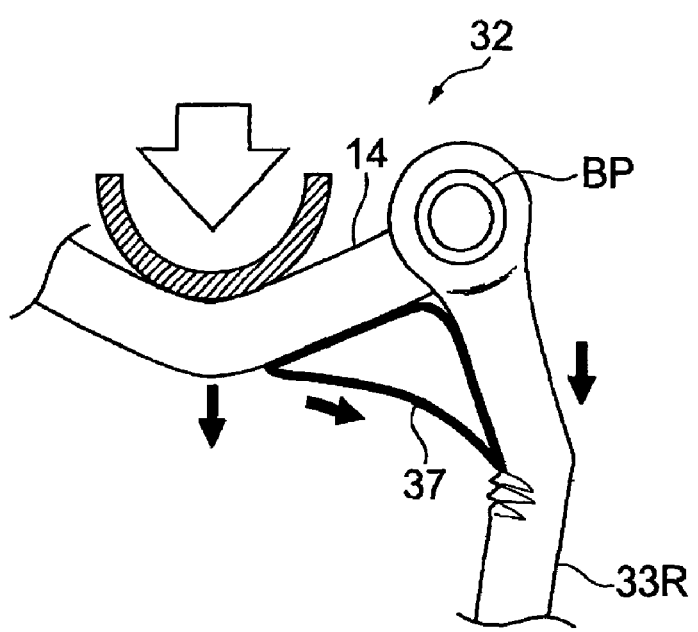
Figure 10:
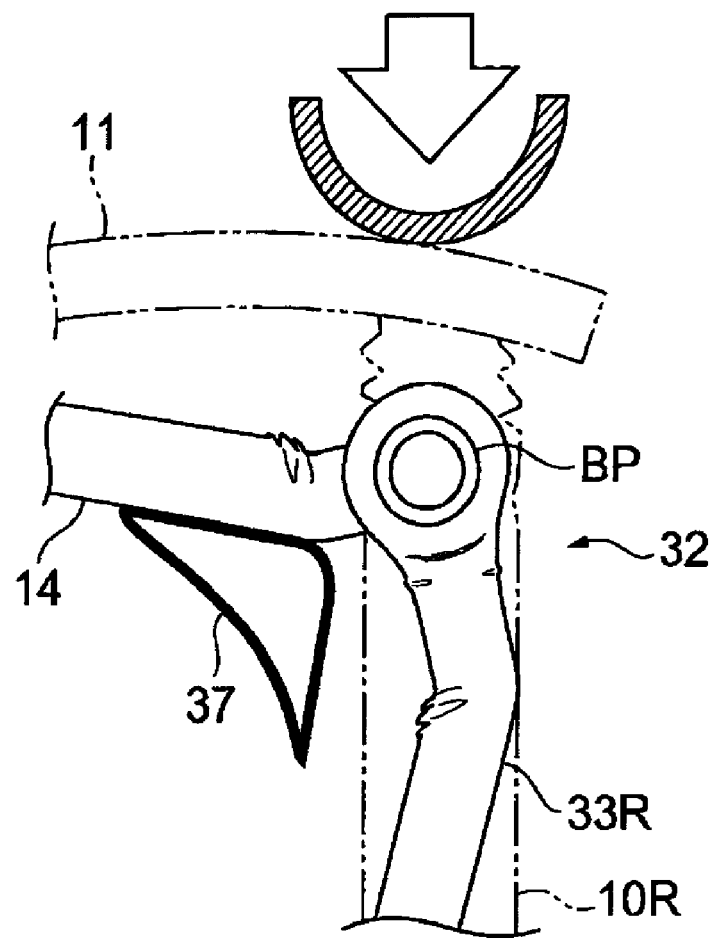
[FIG. 10] is a view for explaining an action in a case where a collision load is fed to a side frame constituting the vehicle front structure in accordance with the third embodiment.

The vehicle front structure in accordance with the third embodiment will now be explained with reference to FIGS. 8 to 10. FIG. 8 is a view showing a load transmission member constituting a subframe in accordance with the third embodiment. FIGS. 9(*a*) and (*b*) are views for explaining an action in a case where a local load is fed to a front frame, whereas FIG. 10 is a view for explaining an action in a case where a collision load is fed to a side frame.

The vehicle front structure in accordance with the third embodiment differs from the above-mentioned first embodiment in that it uses a subframe 32 having a load transmission member 37 attached thereto in place of the subframe 12 having the load transmission member 17 attached thereto. The other structures are identical or similar to the first embodiment and thus will not be explained here.

Inner side faces of each front corner part of the subframe 32 defined by a pair of side frames 33L, 33R, a front frame 14, and a rear frame 15 are provided with a load transmission member 37. FIG. 8 shows the load transmission member 37 under magnification. FIG. 8 illustrates only the right front corner part of the subframe 32. The subframe 32 is substantially bilaterally symmetric, so that the left front corner part is identical or similar to the right front corner part. Hence, the structure of the right front corner part will be explained alone here without explaining the left front corner part.

As shown in FIG. 8, the load transmission member 37 is a reinforcement member in which two boards each having a substantially triangular form are placed parallel to each other, while their bases are connected to each other with a substantially rectangular board, and unconnected sides are formed with flange parts 37a, 37b. Therefore, a cross section of the load transmission member 37 obtained when cut along a plane orthogonal to the flange parts 37a, 37b is formed like a hat.

The flange part 37a abutting against the inner side face of the side frame 33R is fastened to the side frame 33R with four bolts 38. The part of the side frame 33R for attaching the load transmission member is formed with long holes (bolt holes) extending in the front-to-rear direction of the vehicle (axis direction of the side frame 33R). These long holes are each formed such that the diameters on the front and rear sides of the vehicle are smaller and greater than that of the head (or nut) of the bolt 38, respectively. When manufacturing the vehicle, the bolts 38 are inserted into the long holes from the front side of the vehicle, so as to fasten the load transmission member 37 and side frame 33R together. Upon vehicle collision, as the front frame 14 is displaced toward the rear of the vehicle in response to a collision load, the load transmission member 37 and bolts 38 slide along the long holes toward the rear of the vehicle, so that the bolts 38 pull out of the long holes, whereby the load transmission member 37 comes out of the side frame 33R.

The flange part 37b abutting against the inner side face of the front frame 14 is also fastened to the front frame 14 with four bolts (not depicted). The part of the front frame 14 for attaching the load transmission member is formed with bolt holes which have typical circular forms, so that the load transmission member 37 will not come out of them at the time of collision.

When the vehicle V collides with an obstacle such as a pole, for example, so that a collision load is locally fed to substantially the center part of the front frame 14 from the front of the vehicle as indicated by a whitened arrow in FIG. 9(a) in the foregoing structure, the front frame 14 is about to deform by bending into a V shape (i.e., the front frame 14 and side frame 33R are about to rotate in such a direction as to relatively approach each other).

At this time, as shown in FIG. 9(b), the load transmission member 37 restrains the front frame 14 from rotating in such a direction as to approach the side frame 33R as shown in FIG. 9(b). Here, the collision load fed to the front frame 14 is transmitted and dispersed to the side frame 33R through the load transmission member 37, so that the side frame 33R deforms by buckling, whereby the collision energy is absorbed.

When the vehicle V collides with an obstacle, so that a collision load is fed onto the axis of the front side member 10R from the front of the vehicle as indicated by a whitened arrow in FIG. 10, on the other hand, the fed collision load is transmitted to the side frame 33R through the bonding part BP. Therefore, the collision load is also fed onto the axis of the side frame 33R from the front of the vehicle. Then, by deforming by buckling, both of the front side member 10R and side frame 33R gradually absorb the collision energy. At that time, the side frame 33R is displaced outward and rearward of the vehicle while deforming by buckling (i.e., the front frame 14 and side frame 33R rotate in such a direction as to relatively separate from each other).

Here, the side frame 33R is displaced rearward and outward of the vehicle, so that the connection between the load transmission member 37 and side frame 33R is broken, whereby the load is blocked from being transmitted from the side frame 33R to the front frame 14 through the load transmission member 37. As a result, the front frame 14 is restrained from being affected, whereby the collision energy is appropriately absorbed by the side frame 33R (and front side member 10R).

As mentioned above, when the collision load is applied from the front of the vehicle, the load transmission member 37 restrains the front frame 14 and side frame 33R from rotating in such a direction as to relatively approach each other but permits the front frame 14 and side frame 33R to rotate in such a direction as to relatively separate from each other. Hence, the load transmission member 37 also functions as the rotation restricting member recited in the claims.

In the collision mode where a local load is fed to the front frame 14 in this embodiment, the load transmission member 37 restrains the front frame 14 from rotating in such a direction as to approach the side frame 33R. Here, the collision load fed to the front frame 14 is transmitted and dispersed to the side frame 33R through the load transmission member 37, so that the side frame 33R deforms by buckling, whereby the collision energy is absorbed.

In the collision mode where a collision load is fed onto the axis of the side frame 33R, on the other hand, the side frame 33R is displaced rearward and outward of the vehicle, so that the connection between the load transmission member 37 and side frame 33R is broken, whereby the load transmission through the load transmission member 37 is blocked. As a result, the front frame 14 is restrained from being affected, whereby the collision energy is appropriately absorbed by the side frame 33R.

Thus, this embodiment can control the load transmission according to collision modes, whereby the collision energy can efficiently be absorbed regardless of the collision modes. Though FIG. 10 illustrates an example in which the collision load is fed to the front side member 10R, the same holds for a case where the collision load is directly fed to the side frame 33R.

Though this embodiment allows the bolts 38 to pull out upon vehicle collision by forming the long holes (bolt holes) in the side frame 33R such that their diameter on the rear side of the vehicle is greater than that of the head of the bolt 38, the rupture strength of the part fastened to the bolts 38 may be lowered so that the bolts 38 pull out upon vehicle collision.

Though embodiments of the present invention have been explained in detail in the foregoing, the present invention can be modified in various ways without being restricted to the above-mentioned embodiments. For example, the form and structure of the load transmission member are not limited to those of the above-mentioned embodiments.

Figure 11:
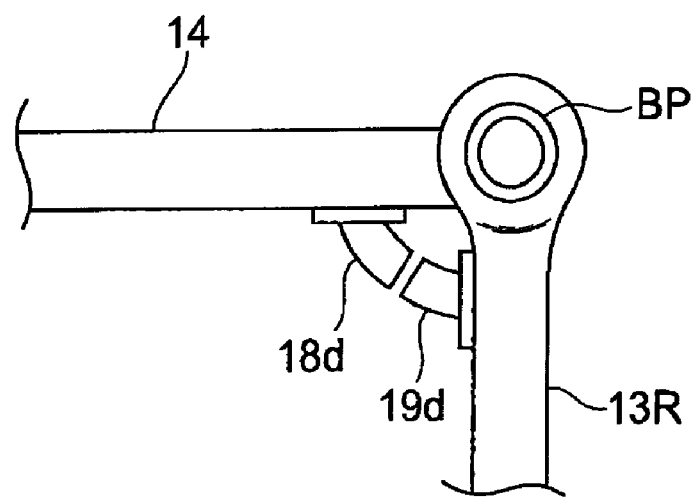
[FIG. 11] is a view showing the vehicle front structure in accordance with another embodiment.

That is, though the leading end parts of the load transmission member male 18 and load transmission member female 19 constituting the load transmission member 17 are open so as to fit the leading end part of the load transmission member male 18 into the leading opening part of the load transmission member female 19 in the above-mentioned first embodiment, a load transmission member male 18d and a load transmission member female 19d may be constructed such that their leading end parts are closed and their leading end faces oppose each other as shown in FIG. 11. In this case, upon vehicle collision, the leading end face of the load transmission member male 18d abuts against the leading end face of the load transmission member female 19*d*, thereby restraining the front frame 14 from rotating in such a direction as to approach the side frame 13R.

Figure 12:
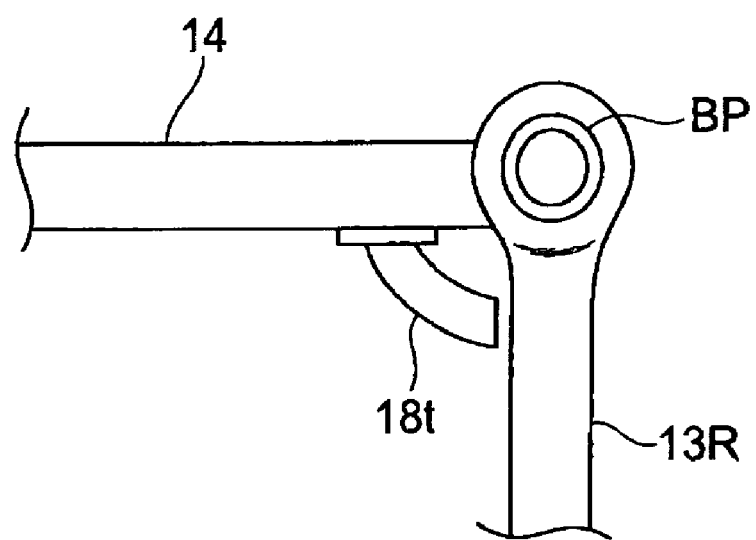
[FIG. 12] is a view showing the vehicle front structure in accordance with another embodiment.

Also employable is a structure which removes the load transmission member female and extends a load transmission member male 18*t* such that its leading end part opposes the inner side face of the side frame 13R as shown in FIG. 12. In this case, upon vehicle collision, the leading end face of the load transmission member male 18*t* abuts against the inner side face of the side frame 13R, thereby restraining the front frame 14 from rotating in such a direction as to approach the side frame 13R.

Further, a so-called ratchet mechanism, in which a gear having asymmetric teeth is supported by a pawl biased with a spring or the like so as to allow rotations in one direction but inhibit rotations in the reverse direction, may be built into the bonding part BP between the front frame 14 and side frame 13R. In this case, the ratchet mechanism restrains the front frame 14 from rotating in such a direction as to approach the side frame 13R upon vehicle collision.

Figure 13:
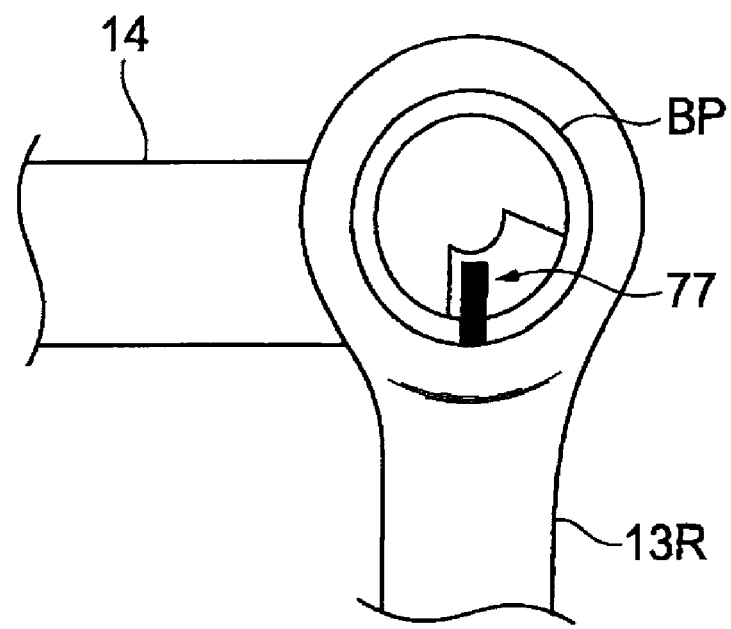
[FIG. 13] is a view showing the vehicle front structure in accordance with another embodiment.

As shown in FIG. 13, a stopper mechanism 77 which prohibits the front frame 14 and side frame 13R from rotating in such a direction as to relatively approach each other but permits the front frame 14 and side frame 13R to rotate in such a direction as to relatively separate from each other may be built into the bonding part BP between the front frame 14 and side frame 13R.

Though the vehicle front structure in accordance with the present invention is employed in the subframe in the above-mentioned embodiments, it is also applicable to bumper reinforcements.

INDUSTRIAL APPLICABILITY

The present invention can efficiently absorb the collision energy regardless of collision modes.

The invention claimed is:

1. A vehicle front structure comprising:
   a pair of left and right longitudinal members provided in a front part of a vehicle so as to extend in a front-to-rear direction of the vehicle;
   a transverse member transversely bridged in a vehicle width direction between respective front end parts of the pair of longitudinal members; and
   a rotation restricting member for restraining the transverse and longitudinal members from rotating in such a direction as to relatively approach each other but permitting the transverse and longitudinal members to rotate in such a direction as to relatively separate from each other when a collision load is applied from a front of the vehicle, wherein the rotation restricting member is placed on the inner side of the longitudinal member in the vehicle width direction.

2. The vehicle front structure according to claim 1, wherein the rotation restricting member is placed between the longitudinal and transverse members and restrains the longitudinal and transverse members from rotating in such a direction as to relatively approach each other.

3. The vehicle front structure according to claim 1, wherein, when the collision load is applied from the front of the vehicle, the rotation restricting member transmits a load of the transverse member to the longitudinal members so as to restrain the longitudinal and transverse members from rotating in such a direction as to relatively approach each other.

4. The vehicle front structure according to claim 1, wherein collision load applied from the front of the vehicle causes the longitudinal member to rotate in such a direction as to separate from the transverse member.

5. The vehicle front structure according to claim 1, wherein, when at least one of the longitudinal and transverse members is deformed by the collision load applied from the front of the vehicle, the rotation restricting member transmits the collision load applied to the transverse member to the longitudinal member and blocks the collision load applied to the longitudinal member from being transmitted to the transverse member.

6. The vehicle front structure according to claim 1, wherein the rotation restricting member is arranged such as to engage the longitudinal and transverse members within an area defined by the longitudinal and transverse members, keeps the engagement with the longitudinal and transverse members when the collision load is applied to the transverse member, and is separated from the longitudinal or transverse member when the collision load is applied to the longitudinal member.

7. The vehicle front structure according to claim 1, wherein the longitudinal and traverse members are side and front frames each constituting a subframe.

8. The vehicle front structure according to claim 1,
   wherein the rotation restricting member includes a male member attached to an inner side face the transverse member and a female member attached to an inner side face of the longitudinal member,
   when the collision load is applied from the front of the vehicle, the male member inserts into the female member, and a leading end part of the female member abuts the transverse member and restrains the transverse member from rotating to approach the longitudinal member.

9. The vehicle front structure according to claim 1,
   wherein the rotation restricting member includes a male member attached to an inner side face the transverse member and a female member attached to an inner side face of the longitudinal member,
   when the collision load is applied from the front of the vehicle, a pin member of the male member inserts into a hole of the female member, and a leading end face of male member abuts a leading end face of the female member and restrains the transverse member from rotating to approach the longitudinal member.

10. The vehicle front structure according to claim 1,
    wherein the rotation restricting member is a triangular reinforcement member with a first board attached to an inner side face the transverse member and a second board attached to an inner side face of the longitudinal member;
    when the collision load is applied from the front of the vehicle, the triangular reinforcement member restrains the transverse member from rotating to approach the longitudinal member, and
    the second board is attached by four bolts via four bolt holes through the longitudinal member, the four bolt holes are each formed with great diameters on the rear side of the vehicle for the bolts to be pulled out of the bolt holes if they slide along toward the rear of the vehicle.

11. The vehicle front structure according to claim 1,
    wherein the rotation restricting member constitutes a male member attached to an inner side face the transverse member and a female member attached to an inner side face of the longitudinal member,
    when the collision load is applied from the front of the vehicle, a leading end face of male member abuts a leading end face of the female member and restrains the transverse member from rotating to approach the longitudinal member.

12. The vehicle front structure according to claim 1,
wherein the rotation restricting member constitutes a male member attached to an inner side face the transverse member when the collision load is applied from the front of the vehicle, a leading end face of male member abuts the longitudinal member and restrains the transverse member from rotating to approach the longitudinal member.

13. The vehicle front structure according to claim 1, wherein the rotation restricting member is a stopper mechanism that prohibits the transverse member and the longitudinal member from rotating in such a direction as to relatively approach each other but permits the transverse member and the longitudinal member to rotate in such as direction as to relatively separate from each other.

* * * * *

UNITED STATES PATENT AND TRADEMARK OFFICE
CERTIFICATE OF CORRECTION

| | |
|---|---|
| PATENT NO. | : 7,850,227 B2 |
| APPLICATION NO. | : 12/442624 |
| DATED | : December 14, 2010 |
| INVENTOR(S) | : Koji Tamakoshi |

It is certified that error appears in the above-identified patent and that said Letters Patent is hereby corrected as shown below:

On the Title Page, under "(30)   Foreign Application Priority Data":

Change "P2006-259197" to --2006-259197--.

| Column | Line | |
|---|---|---|
| 12 | 21 | Change "traverse members" to --transverse members--. |
| 13 | 6 | After "side face" insert --of--. |
| 14 | 6 | Change "such as direction" to --such a direction--. |

Signed and Sealed this
Twelfth Day of April, 2011

David J. Kappos
*Director of the United States Patent and Trademark Office*